US005105203A

United States Patent [19]

Kuwabara et al.

[11] Patent Number: 5,105,203

[45] Date of Patent: Apr. 14, 1992

[54] THERMAL TRANSFER PROCESS WITH IMPROVED RECORDING HEAD LIFE

[75] Inventors: Nobuyuki Kuwabara, Tokyo; Kou Hasegawa, Yokohama; Hideo Sugimura, Yokohama; Kazuhiro Nakajima, Yokohama; Haruhiko Moriguchi, Kawasaki, all of Japan

[73] Assignee: Canon Kabushiki Kaisha, Tokyo, Japan

[21] Appl. No.: 644,690

[22] Filed: Jan. 22, 1991

Related U.S. Application Data

[60] Continuation of Ser. No. 360,488, Jun. 28, 1989, abandoned, which is a division of Ser. No. 141,765, Jan. 11, 1988, Pat. No. 4,858,758.

[30] Foreign Application Priority Data

Apr. 17, 1987 [JP] Japan ................................ 62-093274
Oct. 22, 1987 [JP] Japan ................................ 62-265424

[51] Int. Cl.[5] ......................... B41J 2/325; G01D 9/00

[52] U.S. Cl. ................................ 346/1.1; 346/76 PH; 400/120

[58] Field of Search ........................... 346/76 PH, 1.1; 400/120

[56] References Cited

U.S. PATENT DOCUMENTS 4,855,758 8/1989 Kuwabara et al. ............ 346/76 PH

FOREIGN PATENT DOCUMENTS 57-148682 9/1982 Japan .
0199279 11/1984 Japan .
0024469 2/1986 Japan .
0272172 12/1986 Japan .................................. 400/120

*Primary Examiner*—Benjamin R. Fuller
*Assistant Examiner*—Huan Tran
*Attorney, Agent, or Firm*—Fitzpatrick, Cella, Harper & Scinto

[57] ABSTRACT

A thermal transfer recording apparatus adapted to record an image on a recording medium by transferring a heat-transferable ink from a transfer medium to the recording medium. The apparatus has a transfer medium having on one surface a layer of a heat-transferable electroconductive ink formed on a base sheet, a recording head for heating the transfer medium in accordance with an image signal, and an electrode disposed in physical contact with the ink surface of the transfer medium so as to form a path from the electrode medium through which electric current is allowed to flow. Therefore, the apparatus prevents any path for electricity from being formed between the transfer medium and the recording head.

9 Claims, 10 Drawing Sheets

THERMAL TRANSFER PROCESS WITH IMPROVED RECORDING HEAD LIFE

This application is a continuation of application Ser. No. 360,488, filed on June 28, 1989, which is a divisional of Ser. No. 141,765, filed on Jan. 11, 1988.

BACKGROUND OF THE INVENTION

1. Field of the Invention

The present invention relates to a thermal transfer recording apparatus in which an image is recorded on a recording medium by heating a transfer medium having an ink and transferring the ink to the recording medium.

Some examples of thermal transfer recording apparatus of the type mentioned above are an electronic typewriter, a facsimile apparatus, a copying machine, and a printer. Examples of images which may be recorded by the apparatus include numeric characters, characters, and graphics. Further, recording media which may be used in the apparatus include, in addition to ordinary paper and converted paper, plastic sheets for use in OHPs.

2. Related Background Art

While information-related industries have rapidly developed in the recent years, various types of information processing systems have been developed, and various recording methods suited for these various types of systems have also been developed.

One of these recording methods is a thermal transfer recording method in which a recording head generates heat in accordance with an image signal to record the image. More specifically, such a thermal transfer recording method comprises causing a recording head having resistors which generate heat when supplied with electricity to generate heat in accordance with an image signal, heating an inked sheet coated with a heat-transferable ink by the recording head in a pattern corresponding to the image, and transferring the ink to a recording paper.

Since the principle of thermal transfer recording is simple, an apparatus for recording an image based on this principle is advantageous in various aspects. For instance, a thermal transfer recording apparatus can be compact and be manufactured with low cost, while it can operate with very low noise being generated.

A known thermal transfer recording apparatus, however, has a drawback in terms of durability of the recording head. For instance, if such an apparatus is used for a long period, electrodes of the recording head may be destroyed, thus making it impossible to supply electricity to the heat generating resistors.

The present inventor has conducted various studies on this problem and has found that the cause of the destruction of the electrodes of the recording head is electrochemical reactions in the electrodes of the recording head which are caused by electric current flowing through the inked sheet and the recording head when they are brought into contact with each other. More specifically, the electrodes of the recording head are corroded by the electrochemical reactions and are thereby disconnected, and this makes any supply of electricity to the heat generating resistor impossible. As a result, the recording head will have a very short life. Although a recording head of a thermal transfer recording apparatus is usually covered with a protective film made of, for instance, $SiO_2$ or $Ta_2O_5$, such a protective film sometimes fails to prevent the electrochemical reactions from affecting the surface of the electrodes of the recording head.

SUMMARY OF THE INVENTION

It is an object of the present invention to provide a thermal transfer recording apparatus having an improved durability.

It is another object of the present invention to provide a thermal transfer recording apparatus which is capable of providing clear recorded images.

It is a further object of the present invention to provide a thermal transfer recording apparatus in which, during recording of a predetermined image by using heat generated by a recording head, an electrode forming a path through which electric current is allowed to flow is kept in contact with an electroconductive transfer medium, thereby preventing any path for electric current from being formed between the transfer medium and the recording head, and which is thus capable of preventing the risk that any electrochemical reactions may take place at the portion of contact between the recording head and the transfer medium.

It is a still further object of the present invention to provide a thermal recording apparatus which is capable of preventing the recording head from being destroyed by affection of the ink, regardless of types of the ink, and which is thus capable of providing a high level of reliability.

To these ends, one aspect of the present invention provides a thermal transfer recording apparatus adapted to record an image on a recording medium by transferring a heat-transferable ink from a transfer medium to the recording medium. The apparatus comprises' a transfer medium having on one surface a layer of a heat-transferable ink formed on a base sheet, the ink being electroconductive; a recording head for heating the transfer medium in accordance with an image signal; and an electrode disposed in contact with the inked surface of the transfer medium so as to form a path from the electrode medium through which electric current is allowed to flow.

DETAILED DESCRIPTION OF THE PREFERRED EMBODIMENT

One embodiment of the present invention will be described hereunder with reference to FIGS. 1 to 4.

Figure 1:
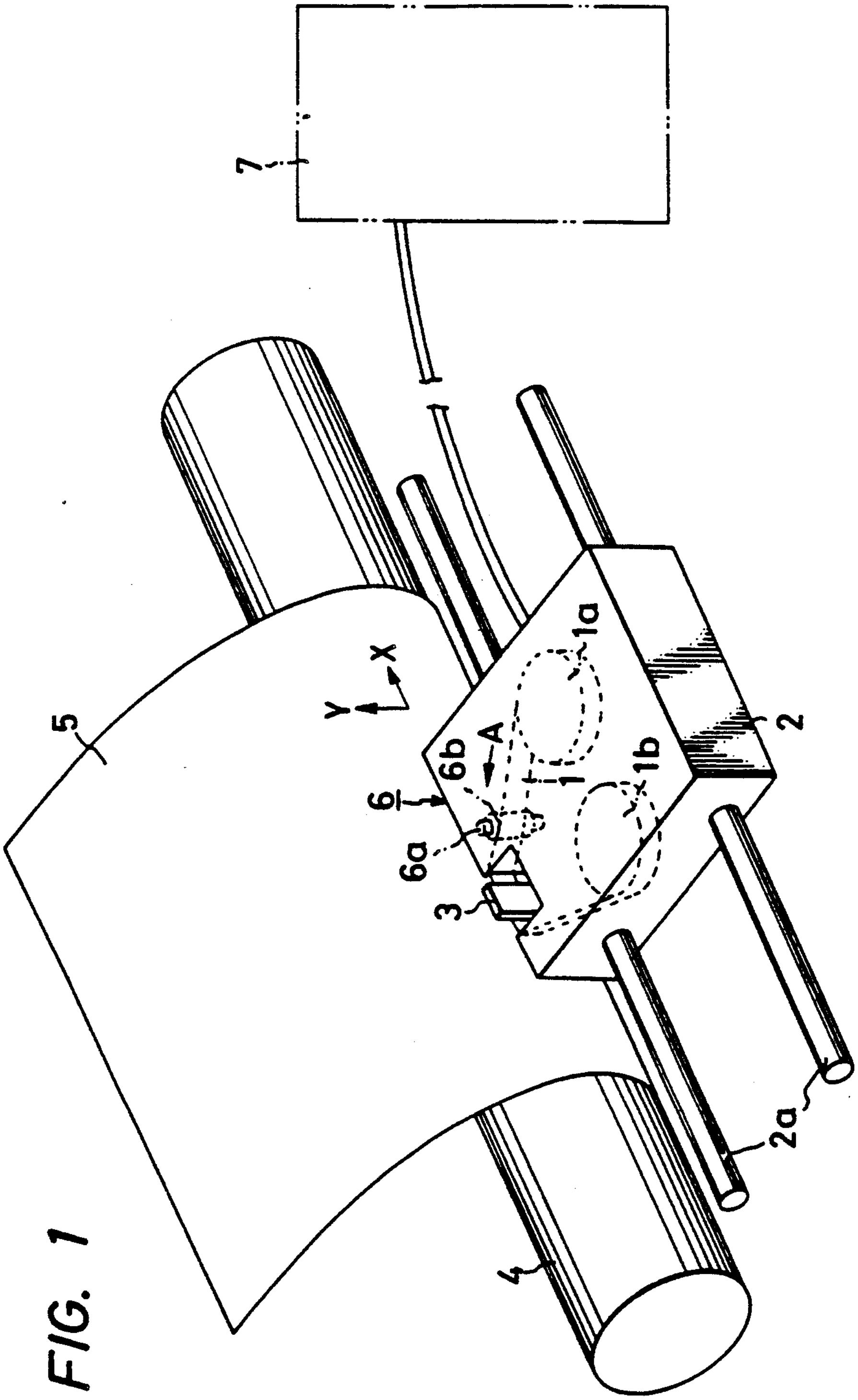
FIG. 1 is a schematic illustration of an embodiment of the present invention in which the present invention is applied to a recording apparatus having a recording head of the serial-type.

FIG. 1 is a perspective view of essential parts of a thermal transfer recording apparatus having a recording head of the serial-type, to which the embodiment of the present invention is applied, by way of example.

Referring to FIG. 1, reference numeral 1 denotes an inked sheet in which a heat-transferable ink is coated on a base sheet and which serves as a transfer medium. The inked sheet 1 is incorporated in a carriage 2 which runs on paired rails 2*a* in the direction of an arrow X when driven by a driving means (not shown). When a recording operation proceeds, the inked sheet 1 is continuously fed and conveyed from a feeding roll 1*a* to a winding roll 1*b*, as indicated by an arrow A.

Reference numeral 3 denotes a recording head of the serial-type in which a plurality of heat generating elements are arranged in an array. The recording head 3 is also incorporated in the carriage. The heat generating elements are supplied with electricity in accordance with an image signal so that they generate heat in response to the supply of electricity.

Figure 2A:
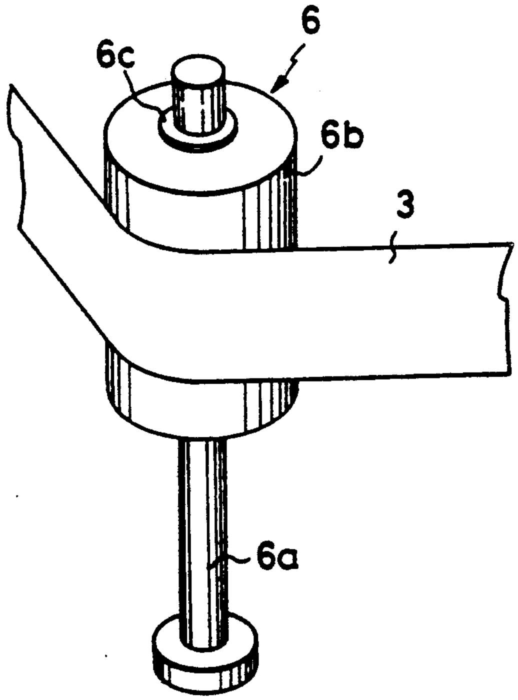
FIGS. 2A and 2B are illustrations of the arrangement of a grounding means.
Figure 2B:
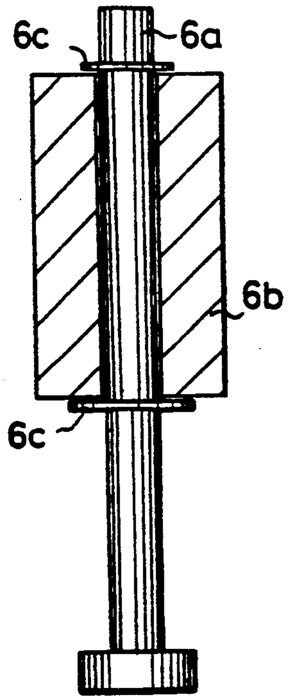

A platen roller 4 supports the reverse surface of a recording sheet 5. The recording head 3 is adapted to press the platen roller 4 at a predetermined pressure through the inked sheet 1 and the recording sheet 5 and is separable from the platen roller 4. A grounding means 6 for grounding the inked sheet 1 is provided in the path through which the inked sheet 1 is conveyed, at a location between the feeding roll 1*a* and the recording head 3. As shown in FIGS. 2A and 2B, the grounding means 6 comprises a shaft 6*a* made of a metal and attached to a cassette accommodating the carriage 2 and the inked sheet 1, a pair of rings 6*c* secured to the shaft 6*a*, and a grounding roller 6*b* made of a metal and disposed between the rings 6*c* rotatively and detachably. The roller 6*b* is disposed in contact with the surface of the inked sheet 1 that is coated with the ink and is adapted to rotate following movement of the inked sheet 1 as the sheet is conveyed. The roller 6*b* is electrically grounded to, for instance, the chassis of the apparatus through the 15 shaft 6*a*.

Operation of the recording apparatus having the above-described construction will now be described.

In an operation of recording a predetermined image, the carriage 2 runs in direction X, and the recording head 3 generates heat in accordance with an image signal supplied from a drive/control means 7, whereby part of the ink of the inked sheet 1 is melt or has its viscosity lowered in a pattern corresponding to the image and is transferred to the recording sheet 5. When recording of image for one line has been completed, the carriage 2 is returned to its home position, and the platen roller 4 is rotated to convey the recording paper 5 by one line in the direction of an arrow Y. These actions are repeated to record the predetermined image in lines on the recording paper 5.

In this recording operation, the inked sheet 1 is kept in contact with the grounding roller 6*b* which is, in turn, grounded to the chassis through the shaft 6*a*. By virtue of this arrangement, the potential of the inked sheet 1 can be made low enough to prevent any electrochemical reactions between the inked sheet 1 and the recording head 3 which may otherwise be caused by contact between these members.

With this arrangement, therefore, if an inked sheet 1 having a resin-based heat-transferable ink is used, it is possible to prevent any corrosion of electrodes of the recording head 3, which corrosion is considered to be attributable to the electrochemical reactions described before. In this way, the durable life of the recording head can be remarkably long.

The materials for use in the shaft 6*a* and the grounding rollers 6*b* of the grounding means 6 may be any good electrical conductor, such as aluminum or iron.

Although in the foregoing example of this embodiment the recording apparatus has a recording head of the serial-type, the present invention is not limited thereto. Instead, the present invention may be applied to a recording apparatus having a recording head of the line-type.

Figure 3:
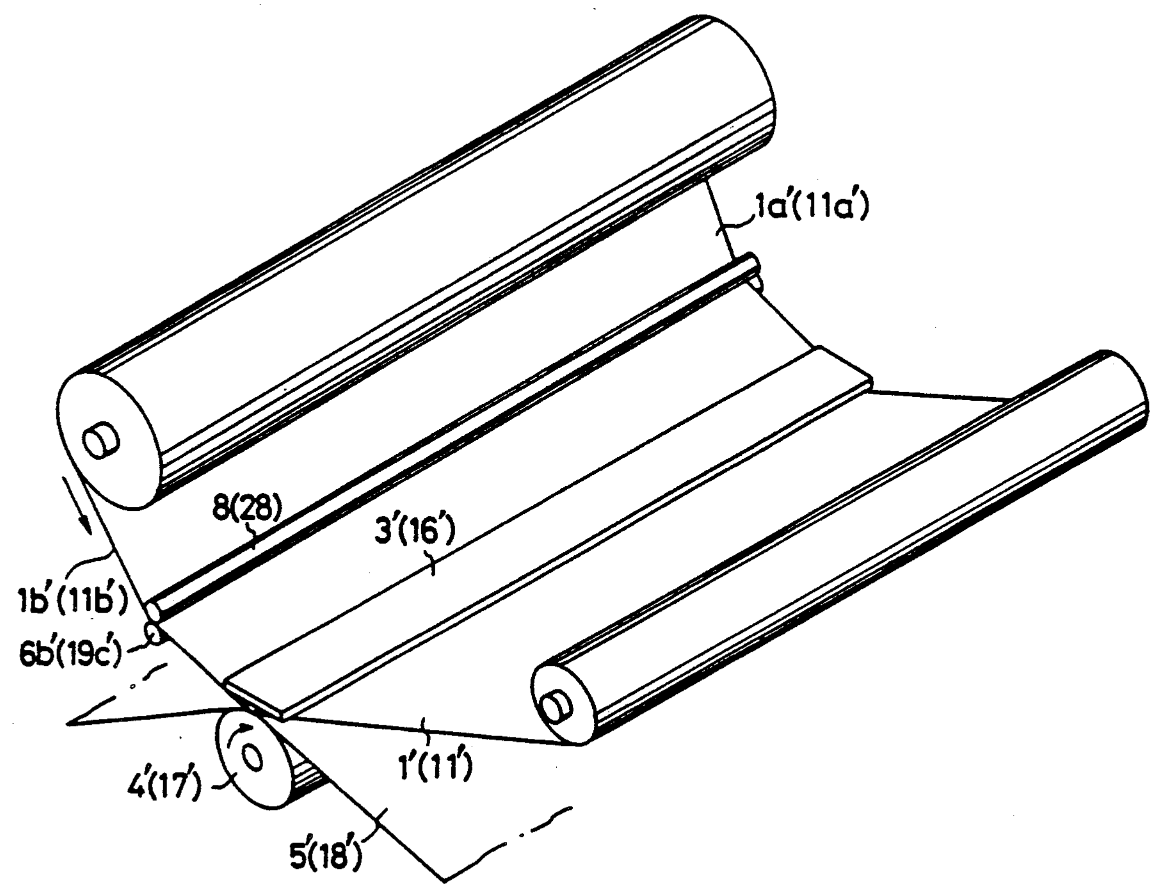
FIG. 3 is a schematic illustration of the embodiment of the present invention in which the present invention is applied to a recording apparatus having a recording head of the line-type.

FIG. 3 illustrates a recording apparatus in which a recording head 3' of the line-type and a platen roller 4, are brought into press contact with each other, and a recording sheet 5' and an inked sheet 1' are conveyed through these members so that the sheets 5' and 1' come close contact with these members, whereby line-type recording is performed. According to the present invention, a grounding roller 6*b*' made of a metal which is a good electrical conductor is disposed in contact with the inked surface of the inked sheet 1' at a portion of the sheet which is not yet brought into close contact with the recording head 3'. The grounding roller 6*b*' is disposed in such a manner as to be rotatable following the movement of the inked sheet 1' as the sheet is conveyed. The roller 6*b*' may be grounded to the chassis of the apparatus, in the same manner as in the previous example.

Similarly to the previous example illustrated in FIG. 1, this arrangement is capable of preventing any electrochemical reactions which may otherwise take place between the inked sheet 1' and the recording head 3', thereby lengthening the durable life of the recording head 3'.

As shown in FIG. 3, a roller 8 is provided in opposition to the grounding roller 6*b*' so that the grounding roller 6*b*' and the inked surface of the inked sheet 1' are kept in good contact with each other. This roller 8 need not be formed with a good electrical conductor, and it may be, for instance, a rubber roller. In addition, the roller 8 may be omitted provided that the contact between the grounding roller 6*b*' and the inked surface of the inked sheet 1' is good without such a roller.

Although in each of the examples illustrated in FIGS. 1 to 3 the grounding member which is in contact with the inked sheet is formed as a roller, the form of the grounding member is not limited thereto and may be any other form so long as it ensures electrical contact between the grounding member and the inked sheet. For instance, the grounding member may be a pin-like contact member.

Although in each of the examples illustrated in FIGS. 1 to 3 the grounding means is provided at a location corresponding to a portion of the inked sheet being conveyed, the grounding means may alternatively be provided at another suitable location. For instance, the grounding means may be incorporated in the feeding roll in such a manner as to be in contact with a portion of the inked sheet being reeled out.

The grounding specified here refers to electrically grounding the transfer media and thereby to minimize the potential of the transfer medium in the portion thereof being conveyed through the path including the recording head, and the grounding is thus not specified to attaining the ground potential.

Figure 4A:
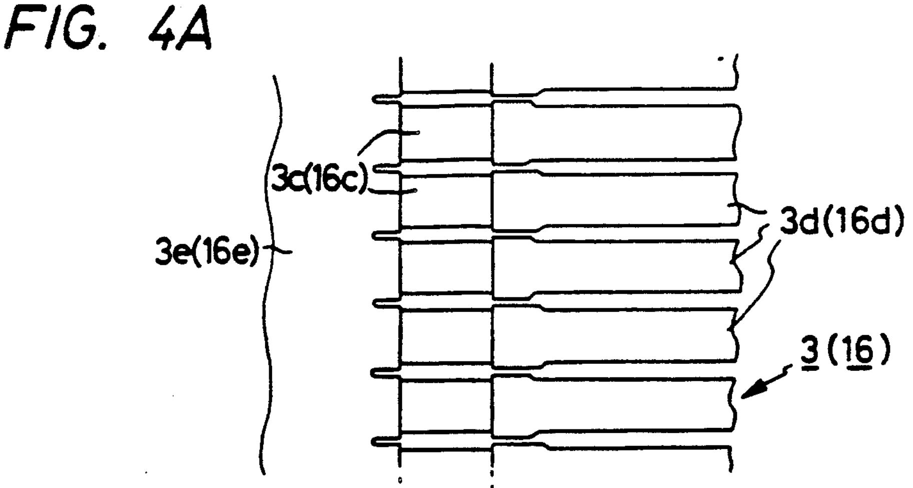
FIG. 4A is a fragmentary plan view of the recording head.
Figure 4B:
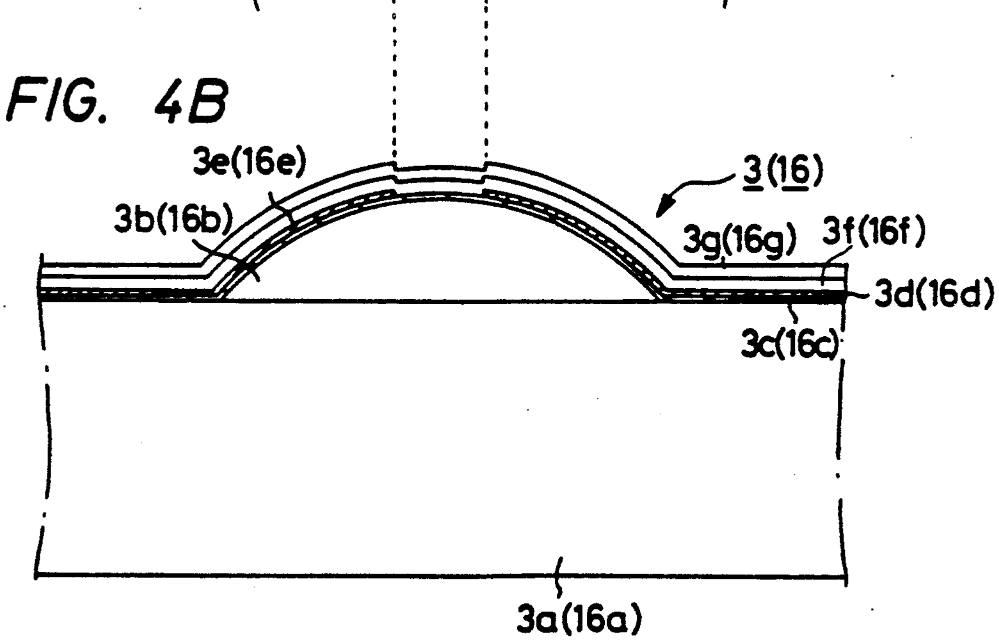
FIG. 4B is a fragmentary sectional view of the recording head.

The structure of the recording head 3 is shown in FIGS. 4A and 4B which are a plan view and a sectional view, respectively. As shown in these figures, the recording head 3 comprises a substrate 3*a* (made of $Al_2O_3$), a glazed portion 3*b* (made of glass) formed on the substrate 3*a*, a heat-generating resistor layer 3*c* (made of $Ta_2N$) formed on the grazed portion 3*b*, individual electrodes 3*d* (made of Al) and a common electrode (made of Al) 3*e* formed on the layer 3*c* for enabling supply of electricity in accordance with an image signal to the heat-generating resistor layer 3*c*, a protective layer (made of $SiO_2$) 3*f* formed on the electrodes 3*d* and 3*e*, and a wear-resistant layer (made of $Ta_2O_5$) 3*g* formed on the protective layer 3*f*.

A thermal transfer recording apparatus in accordance with another embodiment of the present invention will be described hereunder with reference to FIGS. 5 to 8. FIGS. 3 and 4 are also used in the following description.

Figure 5:
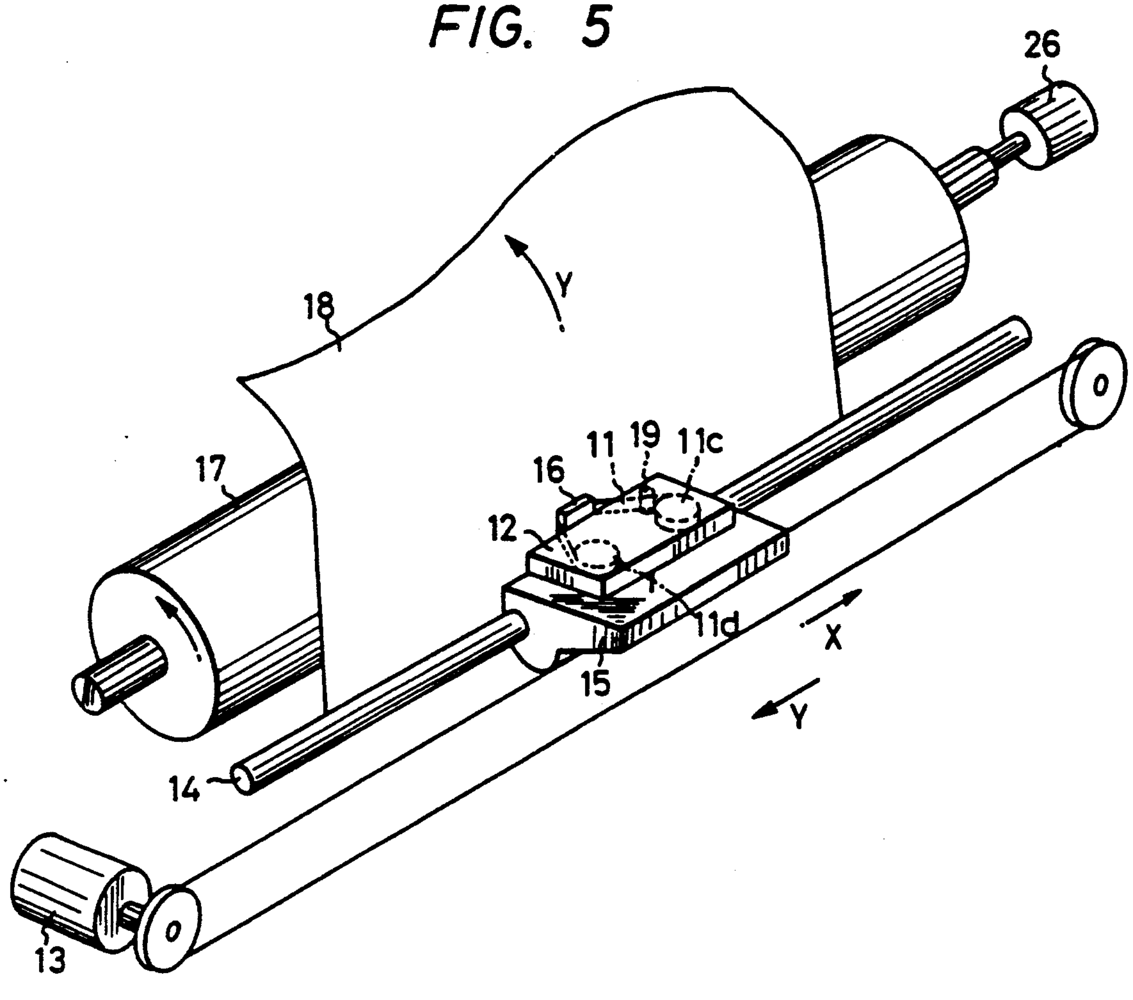
FIG. 5 is a perspective view of a thermal transfer recording apparatus in accordance with another embodiment of the present invention.

FIG. 5 is a perspective view of essential parts of a thermal transfer recording apparatus having a recording head of the serial type, to which the different embodiment of the present invention is applied, by way of example. Reference numeral 11 denotes an inked sheet serving as a transfer medium and having a heat-transferable ink which is electroconductive. The inked sheet 11 comprises a base sheet 11*a* (see FIG. 6A) formed with such a suitable material as polyethylene terephthalate (hereinafter abbreviated to "PET") and a heat-transferable ink 11*b* (see FIG. 6 A ) having electroconductivity. The inked sheet 11 is accommodated within a cassette 12 in the state of being wound at both end portions thereof on a feeding reel 11*c* and a winding reel 11*d*. The cassette 12 is, in turn, detachably mounted on a carriage 15 which runs reciprocally along a rail 14 when driven by a motor 13. The inked sheet is adapted to be continuously conveyed from the feeding reel 11*c* to the winding reel 11*d* when the carriage 15 is running in the direction of an arrow X shown in FIG. 5. The carriage 15 is adapted to move by being driven by the motor 13 reciprocally along the path through which a recording sheet 18 is conveyed, i.e., in direction of X-Y.

The heat-transferable ink 11*b* is provided with electroconductivity by adding a material selected as desired from among materials having relatively high electroconductivities to the components of the ink such as a heat-transferable binder. For instance, electroconductivity may be provided by increasing the content of an electroconductive resin, or by forming the ink as an aqueous emulsion containing a large amount of a surface-active agent having a strong ionicity. Further, electroconductivity may be provided by using as the pigment of the ink electroconductive particles of carbon black, and increasing the content of the carbon black.

The electroconductivity of the inked sheet 11 can be adjusted by varying such an electroconductive component of the ink 11*b* as stated above. However, the electroconductivity of the inked sheet 11 of the apparatus of the present invention should preferably be such that the surface resistance of the ink layer be not more than $10^9\Omega$. for the reasons described later.

In FIG. 5, reference numeral 16 denotes a recording head of the serial type in which a plurality of heat-generating resistors are arranged in an array. The construction of the recording head 16 is such that, as shown in the plan and sectional views in FIGS. 4A and 4B, a glazed portion 16*b* is formed on a substrate 16*a*, a heat-generating resistor layer 16*c* is formed on the glazed portion 16*b*, individual electrodes 16*d* and a common electrode 16*e* are formed on the layer 3*c* for enabling supply of electricity in accordance with an image signal to the heat-generating resistor layer 16*c*, a protective layer 16*f* formed on the electrodes 3*d* and 3*e*, and a wear-resistant layer 16*g* formed on the protective layer 16*f*.

The recording head 16 is mounted on the carriage 15, and, when electricity is supplied in accordance with an image signal to the corresponding ones of the heat-generating resistors, those resistors which have thus supplied with electricity generate heat. The recording head 16 is adapted to press against a platen roller 17 through the inked sheet 11 and a recording sheet 18 which is supported at the reverse surface thereof by the platen roller 17, and the head 16 is separable from the platen roller 17.

Figure 6A:
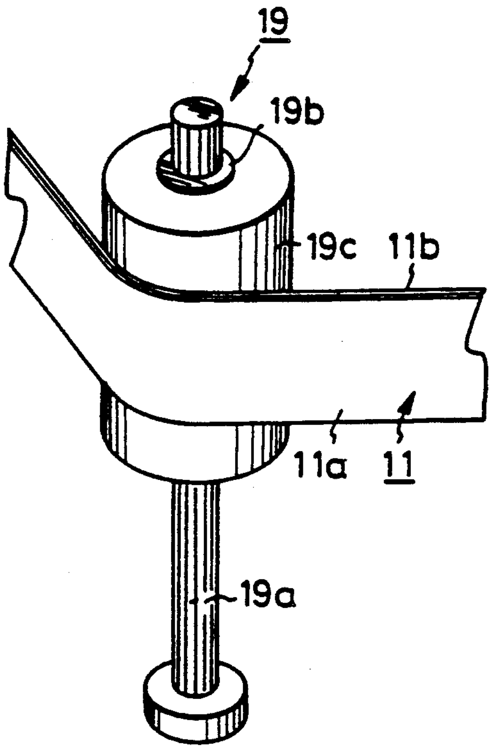
FIGS. 6A and 6B are illustrations of the arrangement of an electric current path forming electrode.
Figure 6B:
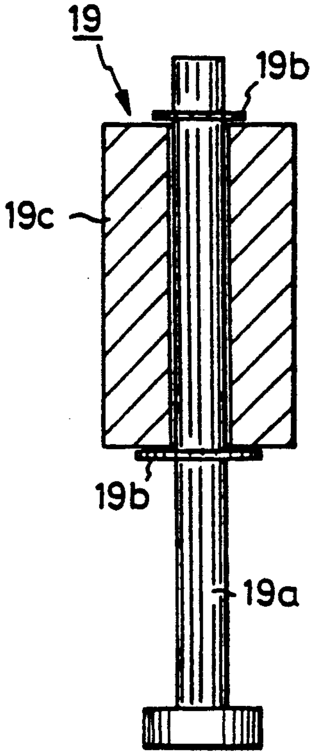

As shown in FIG. 5, an electrode 19 is disposed in a path through which the inked sheet 11 is conveyed at a location between the feeding reel 11*c* and the recording head 16, in such a manner as to be in contact with the inked sheet 11, so as to form a path through which electric current is allowed to flow. (The electrode 16 will hereinafter be referred to as an "electric current path forming electrode". The electric current path forming electrode 19 comprises, as shown in FIGS. 6A and 6B, a shaft 19*a* made of an electroconductive material such as aluminum or iron and attached to the cassette 12 or carriage 15, a pair of rings 19*b* secured to the shaft 19*a*, and an electrode roller 19*c* which is made of the same electro-conductive material as the shaft 19*a* and is disposed on the shaft 19*a* between the rings 19*b* in a rotative but inseparable manner. The electrode roller 19*c* is disposed in contact with the surface of the inked sheet 11 that is coated with the ink 11*b* and is adapted to rotate following movement of the inked sheet 11 as the sheet 11 is conveyed The roller 19*c* is also such that it is connected through the shaft 19*a* to an electric circuit of the apparatus, such as the individual or common electrode 16*d* or 16*e* of the recording head 16, or to a circuit, such as the chassis of the body of the apparatus, which has a predetermined potential (including the ground potential). Thus, the electric current path forming electrode 19 is capable of forming a path between the electroconductive inked sheet 11 and the circuit, e.g., the chassis, through which electricity is allowed to flow.

As shown in FIG. 6A, the inked sheet 11 being conveyed is bent where the sheet 11 is in contact with the electrode roller 19*c*, with the inked surface 11*b* of the sheet 11 facing inward. In this way, tension under which the inked sheet 11 is conveyed enables the inked surface 11*b* of the inked sheft 11 to be kept in positive and adequate contact with the electrode roller 19*c*.

Figure 7:
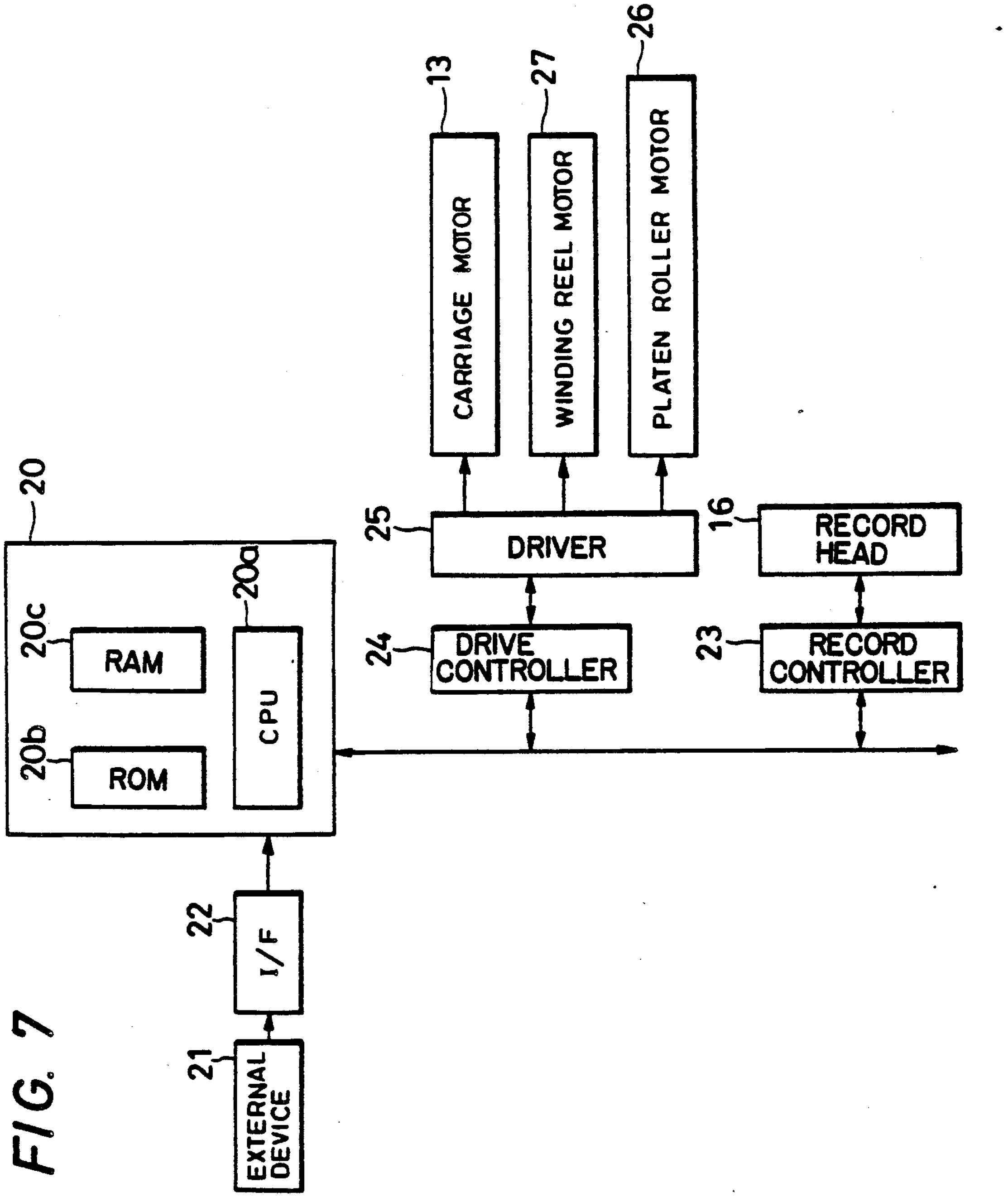
FIG. 7 is a block diagram of a drive/control system.

Next, a drive/control system of the recording apparatus will be briefly described with reference to FIG. 7. In FIG. 7, reference numeral 20 denotes a control section for controlling the entire apparatus, which comprises a CPU 20*a* which is, for instance, a microprocessor, a ROM 20*b* which stores control programs executed by the CPU 20*a* and various data, and a RAM 20*c* which provides a work area for the CPU 20*a* and temporarily stores various data. The drive/control system also has a recording controller 23 and a drive controller 24 connected to the control section 20.

If an image signal is input from an exterior apparatus, which may be either an information producing apparatus such as a document reader or a word processor, or an information transmitting apparatus such as a facsimile equipment, to the CPU 20*a* of the control section 20 through an interface 22 and, simultaneously, if a recording start signal is input thereto from, for instance, a recording start switch (not shown), the recording controller 23 supplies electricity in accordance with the image signal to the corresponding individual electrodes 16*d* whereby the corresponding portion of the heat-generating resistor layer 6*c* generates heat.

Upon the input of the recording start signal to the CPU 20, signals are supplied, simultaneously with the supply of electricity to the individual electrodes 16*d*, to a carriage motor 13 for driving the carriage 15, a platen motor 26 for driving the platen roller 17, and a winding reel motor 27 for winding the inked sheet 11 onto the winding reel 11*d*, respectively, through the drive controller 24 and a driver 25. The motors 13, 26, and 27 are actuated in response to these signals.

Figure 8:
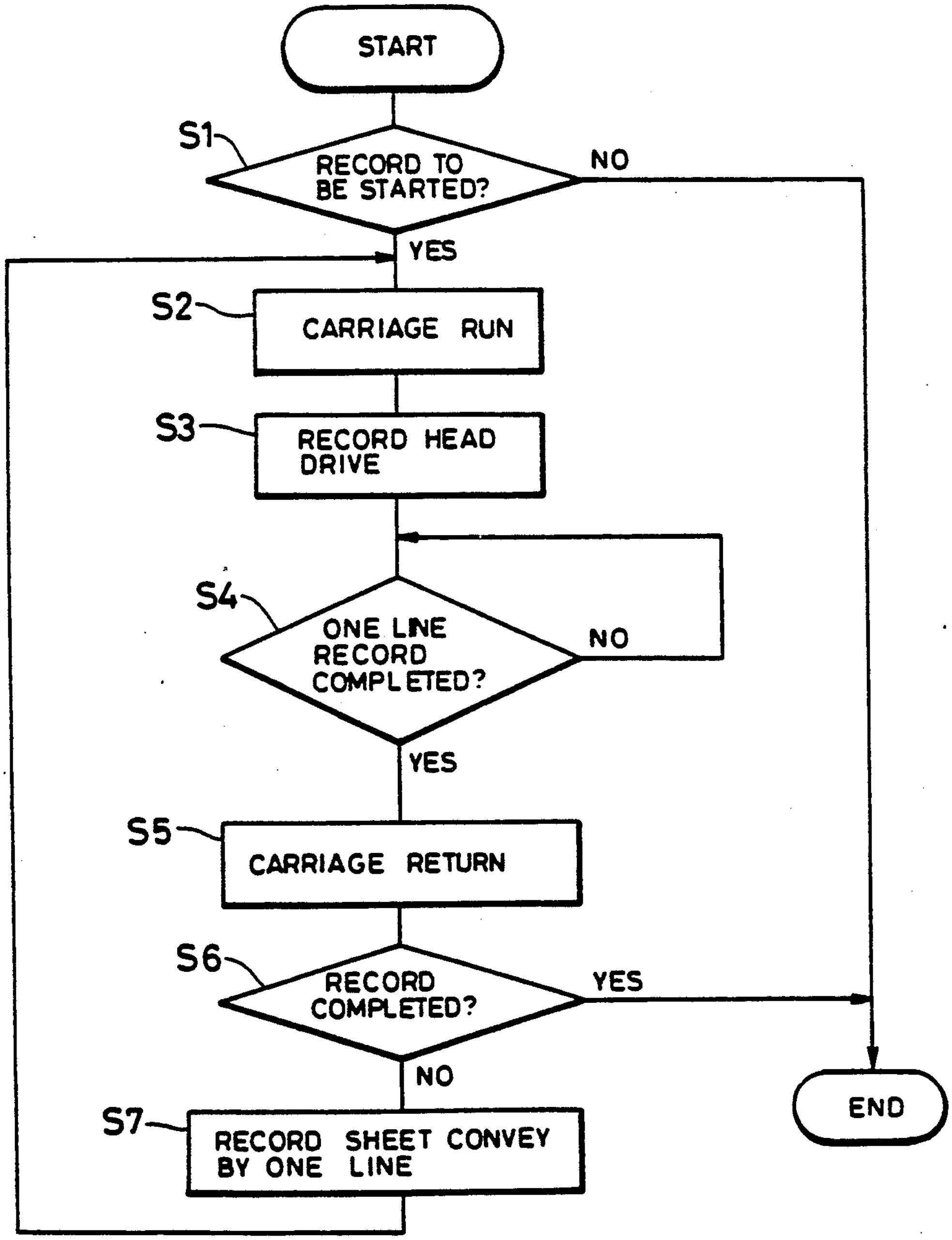
FIG. 8 is a flow chart of recording operation.

Operation of the recording apparatus constructed as described above will now be described with reference to a flow chart in FIG. 8.

When a recording start signal is input (S 1), the carriage 15 starts to run in X direction as viewed in FIG. 5 (S 2), and the recording head 16 is moved to a "head-down" position and is caused to generate heat in accordance with an image signal (S 3). By this action, part of the ink of the inked sheet 11 is melt or has its viscosity lowered in a pattern corresponding to the image and is transferred to the recording sheet 18. When recording for one line has been completed (S 4), the recording head 16 is returned to a "head-up" position, and the carriage 15 is returned to its home position (S 5). If there is no further image signal for recording of subsequent lines, the recording operation is terminated. On the other hand, if there is, the platen roller 17 is rotated to convey the recording sheet 18 by one line in Y direction as viewed in FIG. 5 (S 6 and S 7). Thereafter, steps 2 et.seq. are repeated In the recording operation, the electroconductive inked sheet 11, which is reeled out from the feeding reel 11*c*, is kept in contact with the electrode roller 19*c*, so as to form an electric current path from the inked sheet 11 through the electrode roller 19*c*. This eliminates any electric current which may otherwise flow between the inked sheet 11 and the recording head 16. This, in turn, eliminates any electrochemical reaction which may otherwise take place between the inked sheet 11 and the recording head 16, thereby preventing any corrosion of the electrodes of the recording head which is considered to be attributable to the electrochemical reactions described before. This effect enables a remarkable increase in the durable life of the recording head 16.

In this action of the electrode roller, however, if the surface resistance of the inked sheet 11 is excessively high, the potential of the inked sheet 11 cannot become equal to that of the electrode roller 16*c*, thus reducing the level attainable in the effect of preventing corrosion of the electrodes of the recording head. From this point, therefore, it is preferred that the surface resistance of the inked sheet 11 be not more than about $10^9\Omega$, similarly to the previous embodiment.

Although the above-described example of the different embodiment concerns a thermal transfer recording apparatus having a recording head of the serial-type, it is to be understood that the present invention is not limited thereto. For example, the present invention in accordance with this embodiment may alternatively be applied to a recording apparatus having a recording head of the line-type.

This example will be described with reference to FIG. 3. A thermal transfer recording apparatus is adapted to perform line-type recording by bringing a recording head 16' of the line-type and a platen roller 17' into press contact, and conveying, between these members 16' and 17', a recording sheet 1840 0 and an inked sheet 11' comprising a base sheet 11*a'* and an electroconductive ink 11*b'* coated on the base sheet 11*a'*, in such a manner that the sheets 18' and 11' are in close contact with the platen roller 17' and the recording head 16'. The apparatus is provided with an electrode roller 19*c'* which is disposed in contact with a portion of the inked surface 11*b'* of the inked sheet 11 that is not yet brought into close contact with the recording head 16'. The electrode roller 19*c'* is adapted to rotate following movement of the inked sheet 11' as the sheet 11' is conveyed. The electrode roller 19*c'* is made of a good electric conductor such as a metal, and it may be connected either to an individual electrode or a common electrode of the recording head 16' or to the chassis of the apparatus, similarly to the previous example.

Similarly to the previous example illustrated in FIG. 5, this arrangement also enables prevention of any electrochemical reactions which may otherwise take place between the inked sheet 11' and the recording head 16', thereby lengthening the durable life of the recording head 16'.

In this example illustrated in FIG. 3, a roller 28 is provided in opposition to the electrode roller 19*c'* so that the electrode roller 19*c'* and the inked surface of the inked sheet 11' are kept in good contact with each other. This roller 28 need not be formed with a good electrical conductor, and it may be, for instance, a rubber roller. In addition, the roller 28 may be omitted provided that the contact between the electrode roller 19*c'* and the inked surface of the inked sheet 11' is good without such a roller.

In each of the examples of the second embodiment, it is preferred that the the electric current path forming electrode is in kept in contact with the inked surface of the inked sheet by utilizing the tension of the inked sheet being conveyed In this way, it is possible to prevent any excessive force from acting on the inked sheet while simultaneously preventing any formation of scars on the inked surface and any ripples on the inked sheet.

Although in the examples of the second embodiment illustrated in FIGS. 5 and 3 the heat-transferable inks 11*b* and 11*b'* of the inked sheets 11 and 11' are electroconductive, these examples may be modified in such a way that the base sheets 11*a* and 11*a'* of the inked sheets 11 and 11' are alternatively electroconductive. For instance, although the base sheet usually comprises a PET film having insulating characteristics, the base sheet may be made electroconductive by dispersing electroconductive particles of, for instance, carbon black, in a film such as that described above. However, if the base sheet 11*a* or 11*a'* is made electroconductive, this necessitates complicated processes in manufacture of the base sheet. In addition, this may result in a reduction in the strength of the base sheet. For these reasons, insulating base sheets are used in the foregoing examples. Nevertheless, in actual practice, similar and satisfactory effects could be provided in both cases where the base sheet is electroconductive and where the base sheet has insulating characteristics.

Further, although in the examples of the second embodiment illustrated in FIGS. 5 and 3 the electrode members which are kept in contact with the inked sheets 11 and 11' comprise rollers, this is not necessary. Instead, each of the electrode members may be in any other form so long as the member is able to electrically connect with the inked sheet 11 or 11', and it may be, for instance, a pin-like electrode member.

Still further, although in the example of the second embodiment illustrated in FIGS. 5 and 6 each of the electrode rollers 19*c* and 19*c'* is disposed in the path through which the inked sheet 11 or 11' is conveyed, this is not necessary. For instance, the electrode members may alternatively be disposed in feeding reels 11.

EXPERIMENTS

The following gives explanations on the results of certain experiments conducted by using various apparatus including those similar to what have been described above.

EXAMPLE 1

Recording operations were performed by using a recording apparatus having a recording head of the serial-type, the same as the one shown in FIG. 1.

An inked sheet was prepared by coating a base sheet with a heat-transferable ink containing an ethylene-acetic acid vinyl copolymer as the main component, and the thus prepared inked sheet was used as the inked sheet 1. A recording head of the serial-type having the construction shown in FIG..4 was used as the recording head 3.

Figure 9:
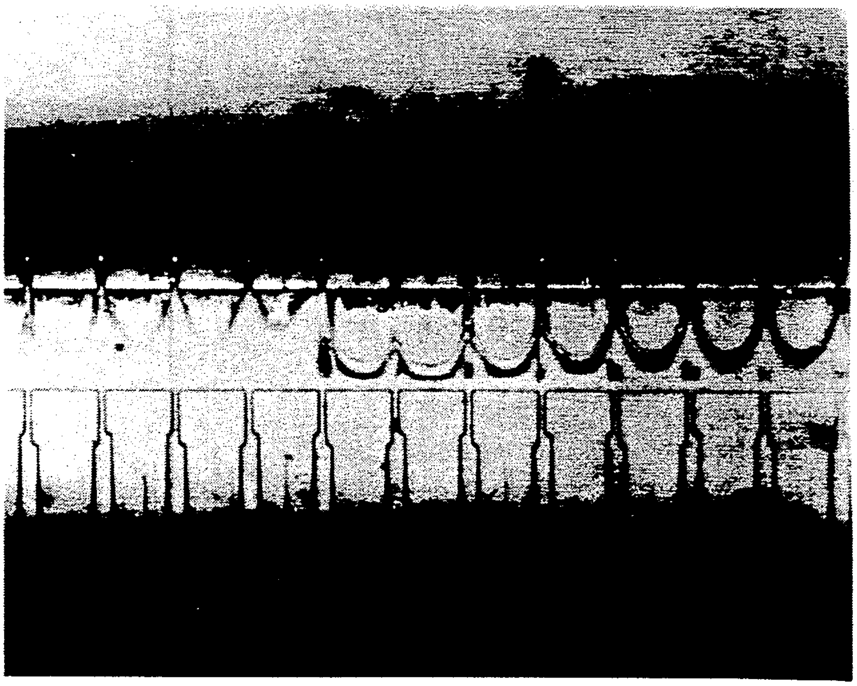
FIG. 9 is a microphotograph taken by means of an optical microscope to show the vicinity of electrodes of a recording head used in Example 1.

With this recording apparatus, 4 million characters were recorded. FIG. 9 shows a copy of microphotograph of the vicinity of the electrodes of the recording head, which was taken after the recording. As can be seen from FIG. 9, no destruction of the recording head 3 took place after the recording operations.

When the potential between the inked surface of the inked sheet 1 and the chassis of the apparatus was measured, no potential was found.

EXAMPLE 2

Recording operations were performed by using a recording apparatus having a recording head of the line-type, the same as the one shown in FIG. 3. This apparatus had an inked sheet 1' in which a heat-transferable ink containing a polyamide-based resin as the main component was coated on a base sheet. The recording was performed by running the carriage through a distance of about 10 km, the distance corresponding to one thousand million pulses per one dot of an image having the black ratio of 12.5%. After the recording, the recording head was examined and the head was found to be free from any destruction.

When the potential between the inked surface of the inked sheet 1' and the chassis was measured, no potential was found.

EXAMPLE 3

Figure 10A:
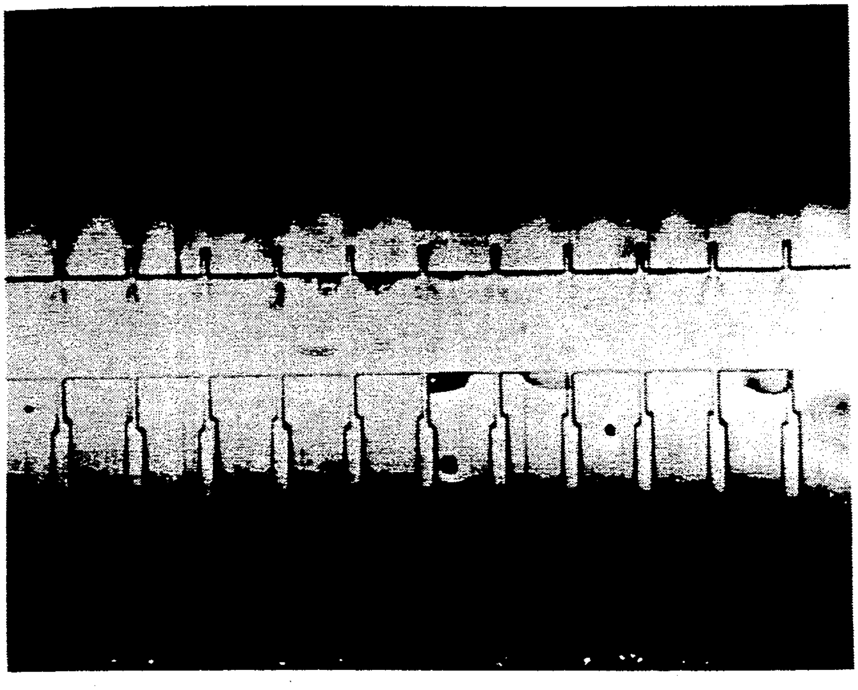
FIG. 10A is a microphotograph similar to that of FIG. 9, which shows the vicinity of electrodes of a recording head used in Example 3.
Figure 10B:
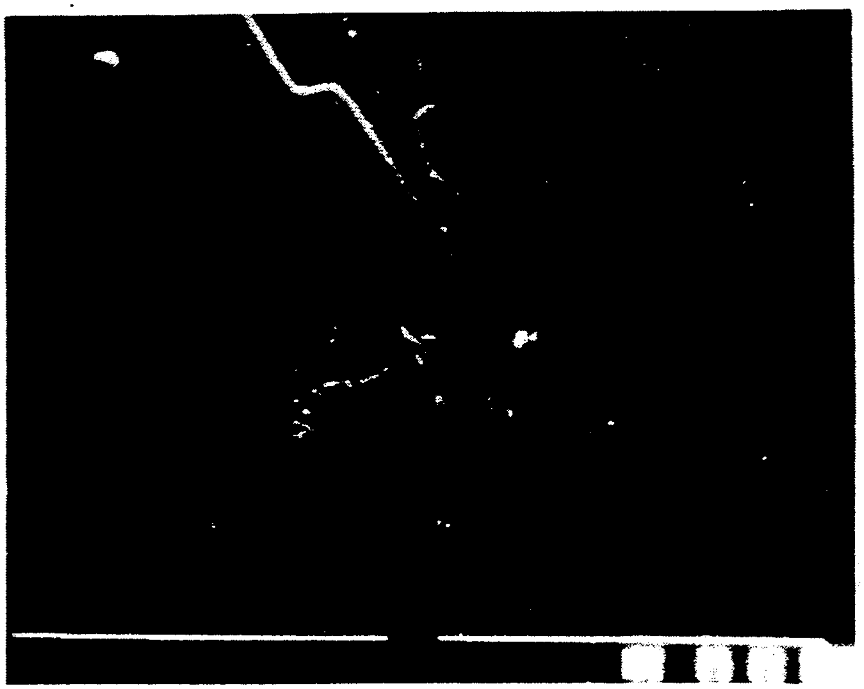
FIG. 10B is a microphotograph taken by means of an electron-beam-scanning type microscope to show the vicinity of the electrodes shown in FIG. 10A.

Continuous recording operations were performed by using a recording apparatus having a recording head of the serial-type. This apparatus was the same as the one shown in FIG. 1 except that the grounding means 6 had been removed. With this apparatus, it was considered that electrical actions occurred at the portion of contact between the inked sheet and the recording head 3, thus causing corrosion of the electrodes of the recording head 3. When 500 thousand characters had been recorded, destruction occurred in the electrodes of the recording head, as shown in FIGS. 10A and 10B. FIG. 10A shows a copy of microphotograph of the vicinity of the electrodes, which was taken by means of an optical microscope. In FIG. 10A, black portions indicate portions of the electrodes which were destroyed. FIG. 10B shows a copy of microphotograph of the vicinity of the individual electrodes where the destruction occurred, which was taken by an electron-beam-scanning type microscope.

When the potential between the inked surface of the inked sheet 1 and the chassis was measured, a potential of 2V was detected.

EXAMPLE 4

Recording operations were performed by using a thermal transfer recording apparatus having a recording head of the serial-type, the same as the one shown in FIG. 5.

An inked sheet was prepared by coating a PET film with an emulsion containing an ethylene-acetic acid vinyl copolymer as the main component and carbon black as the pigment, the emulsion serving as the heat-transferable ink, and the thus prepared inked sheet was used as the inked sheet 11. A recording head of the serial-type having the construction shown in FIG. 4 is used as the recording head 16. In this recording head 16, the substrate 16*a* was made of $Al_2O_3$, the glazed portion 16*b* was made of glass, the heat-generating resistor layer 16*c* was made of $Ta_2N$, the individual electrodes 16*d* and common electrode 16*e* were made of Al, the protective layer 16*f* was made of $SiO_2$, and the wear resistant layer 16*g* was made of $Ta_2O_5$.

When 4 million characters had been recorded with this apparatus, the electrodes of the recording head 16 were examined and were found to be free from any destruction.

When the surface resistance of the inked surface of the inked sheet 11 was measured, it was found to be $1.2\times10^7\Omega$.

EXAMPLE 6

Recording operations were performed by using a recording apparatus having a recording head of the line-type, the same as the one shown in FIG. 3. This apparatus had an inked sheet 11' in which a heat-transferable ink containing wax and a polyamide-based resin as binders and 30 parts by weight of carbon black was coated on a PET film by hot melting. The recording was performed by running the carriage through a distance of about 10 km, the distance corresponding to one thousand million pulses per one dot of an image having the black ratio of 12.5%. After the recording, the recording head was examined and the head was found to be free from any destruction.

When the surface resistance of the inked surface of the inked sheet 11′ was measured, it was found to be $5\times10^{6}\Omega$.

EXAMPLE 6

Continuous recording operations were performed by using a recording apparatus having a recording head of the serial-type. This apparatus was the same as the one shown in FIG. 5 except that the electric current path forming electrode 16 had been removed. With this apparatus, it was considered that electrical actions occurred at the portion of contact between the inked sheet 11 and the recording head 16, thus causing corrosion of the electrodes of the recording head 16. When 500 thousand characters had been recorded destruction occurred in the electrodes of the recording head 16.

EXAMPLE 7

Continuous recording operations similar to those in Example 6 were performed by using a recording apparatus having a recording head of the serial-type. This apparatus was the same as that used in Example 6 except that the apparatus had an inked sheet 11 in which a heat-transferable ink containing wax and a polyamide resin as binders and 10 parts by weight of carbon black was coated on a PET film by hot melting. The surface resistance of the inked surface of the inked sheet 11 was found to be $2\times10^{10}\Omega$. When 1 million characters had been recorded, destruction which was similar to that in Example 6 occurred in the electrodes of the recording head 16.

As described above, according to the present invention, the heat-transferable ink of the transfer medium is electroconductive, and also the inked surface of the transfer medium is brought into contact with an electrode forming a path through which electric current is allowed to flow, thereby preventing any electrical actions from occurring between the transfer medium and the recording head. Therefore, in accordance with the present invention, it is possible to prevent any electrochemical destruction of the recording head, thereby to attain a remarkable increase in the durable life of the recording head and ensure a high level of reliability of the apparatus.

Other effects of the present invention include the effect of allowing the transfer medium to discharge electricity even in the event that, as has conventionally been known, the transfer medium is affected by static electricity and is frictionally electrified.

What is claimed is:

1. A recording method for transferring ink from an electroconductive transfer medium to a recording medium comprising the steps of:

providing a recording head having a plurality of heat generating elements for use in heating said transfer medium, said recording head generating heat in response to an image signal so as to record on said recording medium;

bringing a contacting member having a resistance value by which an electric current is allowed to flow into contact with a surface of an ink layer of said transfer medium on a side opposite to a side heated by said recording head, said contacting member being electrically grounded, said contacting member being electrically grounded, said contacting member contacting said transfer medium after said transfer medium is released from a wound state and before said transfer medium is heated by said recording head; and recording onto said recording medium by heating said transfer medium while in a state allowing the electric current to flow between said contacting member and said transfer medium.

2. A recording method according to claim 1, wherein resistance of said surface of said ink layer is not more than $10^{9}\Omega$.

3. A recording method according to claim 1, wherein said ink is an emulsion type.

4. A recording method according to claim 1, wherein said recording head has a protective layer.

5. A recording method according to claim 1, wherein said ink layer contains an ethylene-acetic acid vinyl copolymer as a main component and carbon black as a pigment.

6. A thermal transfer recording method for transferring ink from an electroconductive transfer medium to a recording medium in response to an image signal so as to record on said recording medium, comprising the steps of:

providing a recording head having a plurality of heat generating elements for use in heating said transfer medium;

bringing said recording head into contact with said transfer medium, and bringing a contacting member into contact with a surface of an ink layer of said transfer medium on a side opposite to a side heated by said recording head that has a resistance low enough to allow an electric current flow, said contacting member being electrically grounded, said contacting member contacting said transfer medium after said transfer medium is released from a would state and before said transfer medium is heated by said recording head; and causing said recording head to generate heat to record in a state allowing the electric current to flow between said contacting member and said transfer medium and allowing the electric current to flow between said recording head and said transfer medium.

7. A recording method according to claim 6, wherein resistance of said surface of said ink layer is not more than $10^{9}\Omega$.

8. A recording method according to claim 6, wherein said ink is an emulsion type.

9. A recording method according to claim 6, wherein said ink layer contains an ethylene-acetic acid vinyl copolymer as a main component and carbon black as a pigment.

* * * * *

UNITED STATES PATENT AND TRADEMARK OFFICE

CERTIFICATE OF CORRECTION

PATENT NO. : 5,105,203

DATED : April 14, 1992

INVENTOR(S) : NOBUYUKI KUWABARA ET AL.    Page 1 of 3

It is certified that error appears in the above-identified patent and that said Letters Patent is hereby corrected as shown below:

COLUMN 1

Line 7, "1988." should read --1988, now U.S. Patent No. 4,858,758.--.

COLUMN 2

Line 34, "prises'" should read --prises:--.

COLUMN 3

Line 8, "EMBODIMENT" should read --EMBODIMENTS--.
Line 36, "A" should begin a new paragraph.
Line 51, "15" should be deleted.
Line 58, "melt" should read --melted--.

COLUMN 4

Line 15, "rollers" should read --roller--.
Line 27, "come" should read --come into--.

COLUMN 5

Line 15, "grazed" should read --glazed--.

UNITED STATES PATENT AND TRADEMARK OFFICE
CERTIFICATE OF CORRECTION

PATENT NO. : 5,105,203

DATED : April 14, 1992

INVENTOR(S) : NOBUYUKI KUWABARA ET AL.

It is certified that error appears in the above-identified patent and that said Letters Patent is hereby corrected as shown below:

COLUMN 6

Line 14, "formed" should read --is formed--.
Line 15, "formed" should read --is formed--.
Line 32, "electrode 16" should read --electrode 19--.
Line 34, "electrode"." should read --electrode".)--.
Line 46, "conveyed" should read --conveyed.--.
Line 62, "sheft" should read --sheet--.

COLUMN 7

Line 18, "layer 6c" should read --layer 16c--.
Line 20, "CPU 20," should read --CPU 20a,--.
Line 36, "melt" should read --melted--.
Line 47, "repeated" should read --repeated.--.

COLUMN 8

Line 16, "sheet 1840 0" should read --sheet 18'--.
Line 52, "conveyed" should read --conveyed.--.

COLUMN 9

Line 22, "reels 11." should read --reel 11c.--.
Line 40, "Fig..4" should read --Fig. 4--.

COLUMN 11

Line 10, "electrode 16" should read --electrode 19--.

UNITED STATES PATENT AND TRADEMARK OFFICE

CERTIFICATE OF CORRECTION

PATENT NO. : 5,105,203

DATED : April 14, 1992

INVENTOR(S) : NOBUYUKI KUWABARA ET AL.

It is certified that error appears in the above-identified patent and that said Letters Patent is hereby corrected as shown below:

COLUMN 12

Line 4, "said contact-" should be deleted.
Line 5, "ing member being electrically grounded," should be deleted.
Line 43, "would" should read --wound--.
Line 48, "and" should read --and not--.

Signed and Sealed this

Seventh Day of September, 1993

Attest:

BRUCE LEHMAN

Attesting Officer

Commissioner of Patents and Trademarks